Oct. 26, 1965  J. V. FOA  3,213,802
TRANSPORTATION MEANS AND METHOD
Filed July 13, 1962  3 Sheets-Sheet 1
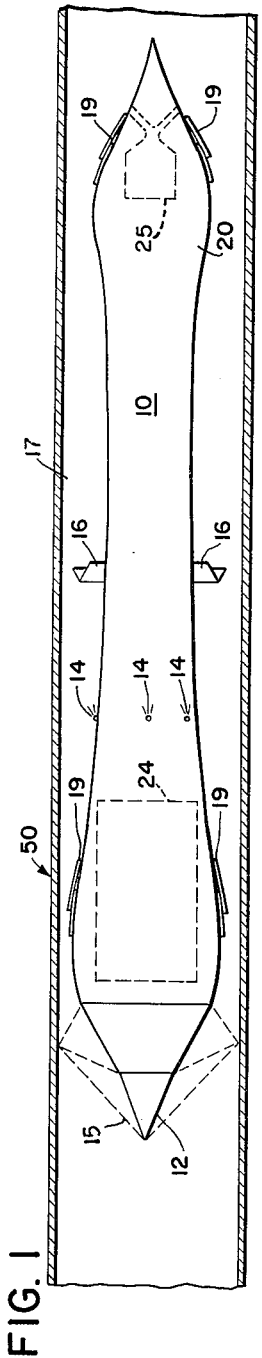
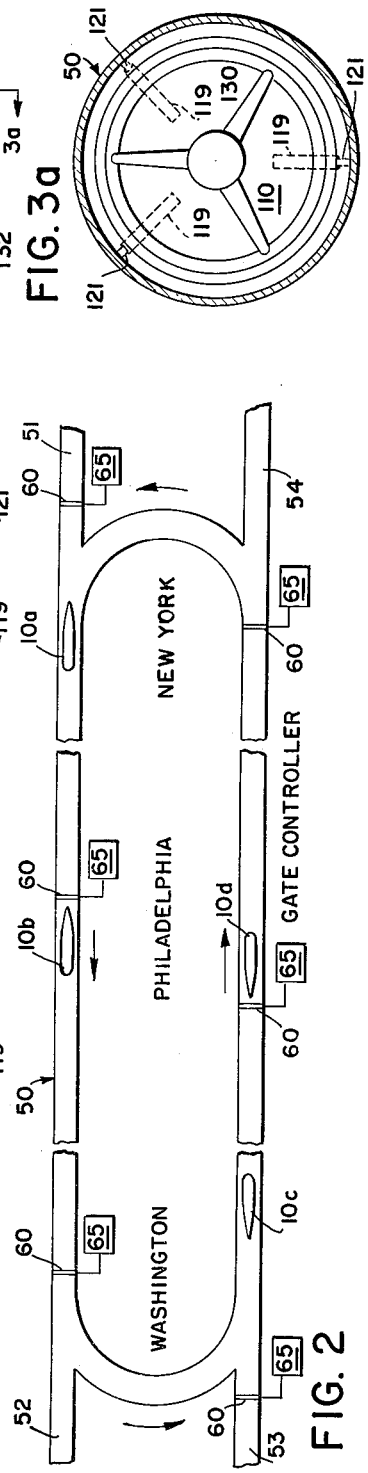
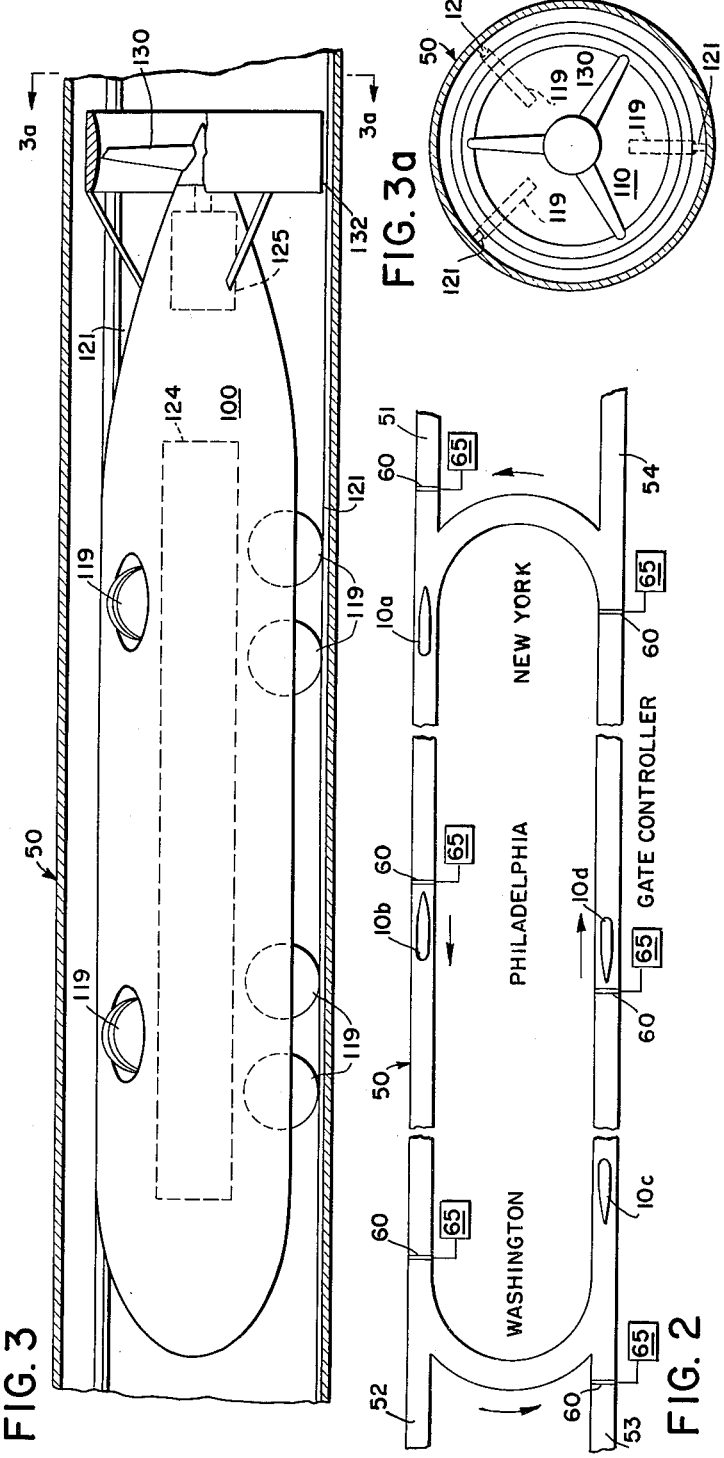

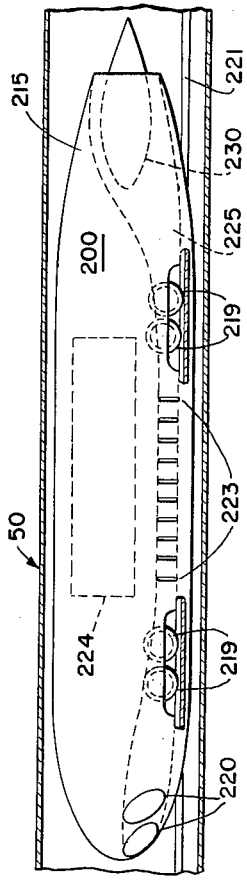
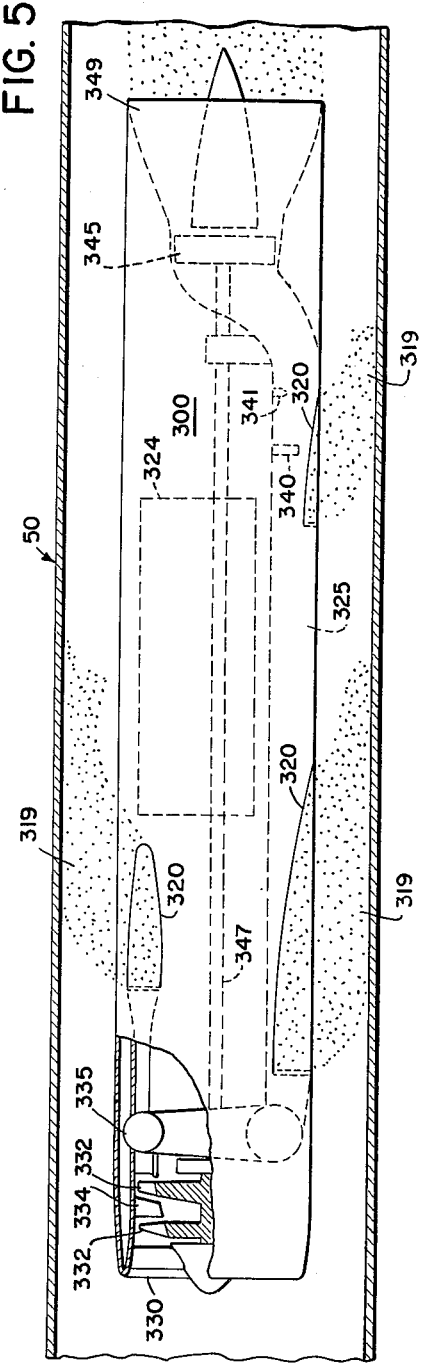

Oct. 26, 1965  J. V. FOA  3,213,802
TRANSPORTATION MEANS AND METHOD
Filed July 13, 1962  3 Sheets-Sheet 3

United States Patent Office 3,213,802
Patented Oct. 26, 1965

3,213,802
TRANSPORTATION MEANS AND METHOD
Joseph V. Foa, 33 Point View Drive, Troy, N.Y.
Filed July 13, 1962, Ser. No. 209,529
9 Claims. (Cl. 104—138)

This invention relates to a novel means of transportation capable of high-speed travel from place to place with great economy, reliability, and safety. More particularly, this invention relates to a high-speed transportation system in which a self-propelled vehicle travels at high velocity through a tube.

Land-traveling vehicles are generally free from the hazards and operational limitations of air transport, including the possibly disastrous effects caused by minor or human malfunction, weather conditions, traffic saturation, etc., and can be readily adapted with a variety of internal and external automatic control systems to provide any desired degree of safety. Unfortunately, the speed of land-traveling vehicles has not kept pace with the marked advances in air transportation over the last several decades. For example, while the speed of the commercial jet-liner is almost tenfold that of the biplane of the 1920's, railroad trains operate at much the same speeds as they did fifty years ago. It has generally been thought that practical land vehicles were inherently confined to speeds much lower than those now possible in the field of air transportation.

Among the principal limitations on the speed of land-traveling vehicles is the necessity of constraining the movement of a vehicle to a narrow, defined path of travel with resultant guidance and control problems caused by the large transverse forces and accelerations which are produced as the vehicle moves along the ground at high speed. In an effort to overcome the problems associated with high-speed land travel, experimental land vehicles of massive size with low centers of gravity, designed for speeds up to 400 m.p.h., have been considered. However, unless the travel of vehicles of this type is on a straight-line path over flat terrain, additional restraining means, such as tracks must be provided to enable the fast-moving vehicle to successfully negotiate bumps, curves, and other variations in the roadway. (Banked turns also provide some lateral restraint but they are useful only for travel within a narrow and fixed speed range.) Nevertheless, control and guidance of vehicles traveling over open roadways, even when tracks and banked turns are provided, become extremely difficult at great speeds because of the influence of wind gusts and varying environmental conditions (rain, snow, ice, etc.). The required support or restraint may be readily provided when the vehicle moves within a tube.

In conventional tube transportation systems, the vehicle, in traveling within the tube, acts on the adjacent air masses, either as a driving piston (as in the case of a subway train in a tunnel) or as a driven piston (as in a pneumatic dispatch system), and therefore motion of the vehicle is accompanied by large displacements of the air masses within the tube. In a tube of any substantial length, the power required to overcome the frictional resistance to the motion of the air column in the tube—a motion which, depending upon the cross-sectional area of the vehicle and tube, may be of the same order of magnitude throughout the tube as the velocity of the vehicle itself—increases as the cube of the velocity. Accordingly, the frictional force resisting the fluid flow rapidly becomes so great that the operation of such a transportation system, at speeds much above those now used (e.g. 60–70 miles per hour), is rendered impractical, if not impossible, by the enormous amount of propulsive power required. For instance, at normal pressure and temperature, the frictional resistance to the motion of a column of air one mile long in a smooth-walled 10 ft.-diameter tube increases from a little over a ton at 50 m.p.h. to the order of 15 tons at 200 m.p.h., to 80 tons at 500 m.p.h., and to 300 tons at 1000 m.p.h. Thus, the power required per mile of air-column length to maintain this motion increases from about 300 H.P. at 50 m.p.h. to about 17,500 H.P. at 200 m.p.h., to about 230,000 H.P. at 500 m.p.h., and is already in the millions of H.P. at speeds in the neighborhood of 1000 m.p.h.

It is therefore a principal objective of the present invention to provide a new mode of land-based high-speed transportation which overcomes the speed limitations of conventional land-traveling vehicles.

It is another objective of the present invention to provide a vehicle for a high-speed tube transportation system which requires substantially less power for propulsion than tube transportation systems heretofore known.

It is a further objective of the present invention to provide a self-propelled carrier for passengers and freight in a land transportation system which is capable of operation at speeds equal to or greater than present day airliners with a high degree of control and dynamic stability, is highly efficient and economical in operation, and is characterized by that degree of dependability and safety normally associated with conventional railroad systems.

The foregoing and other objects, features and advantages of the present invention relating to a novel high-speed transportation means will be more readily understood upon consideration of the following detailed description of various illustrative embodiments of the invention, taken in conjunction with the accompanying drawings.

FIG. 1 is a side elevational view, partially sectional, showing a first illustrative embodiment of a transport vehicle according to the present invention.

FIG. 2 is a diagrammatic representation of a tube transportation system according to the present invention.

FIG. 3 is a side elevational view, partially sectional, showing a second illustrative embodiment of the present invention.

FIG. 3a is a cross-sectional view taken along the line 3a—3a of FIG. 3.

FIG. 4 is a side elevational view, partially sectional, of a third embodiment of the present invention.

FIG. 4a is a fragmentary, partially sectional view of the embodiment of the transport vehicle of FIG. 4.

FIG. 4b is a fragmentary, partially sectional view of a modification of the embodiment of the transport vehicle of FIG. 4.

FIG. 5 is a side elevational view, partially sectional, of a fourth embodiment of the present invention.

Figure 6:
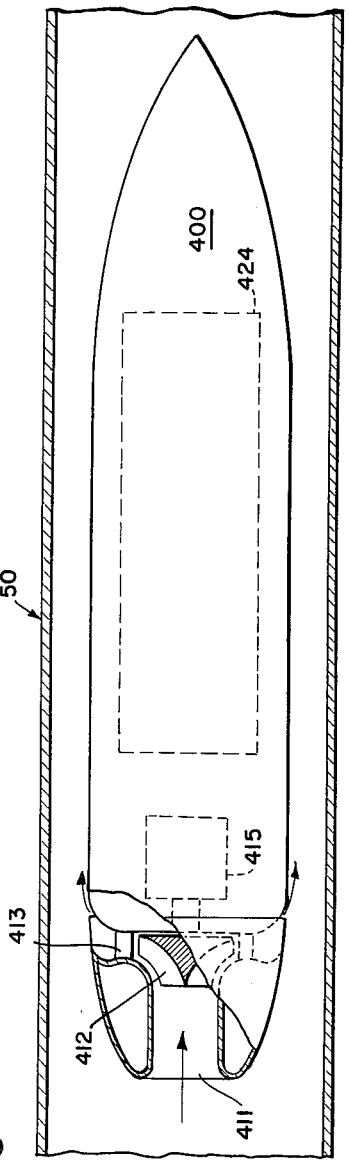
FIG. 6 is a side elevational view, partially sectional, of a fifth embodiment of the present invention.

Referring now to FIG. 1, there is shown therein an illustrative embodiment of the present invention comprising a self-propelled transport vehicle 10 traveling (to the left in the figure) within a tubular conduit 50. The nose of vehicle 10 is generally in the form of the nose of the central body of a ram-jet engine having a spike type intake diffuser 12. Nozzles 14 are located downstream from the air intake 12 of the vehicle and supply fuel for intermixing with the diffused air as the vehicle 10 travels within the conduit 50 at high velocity. Flame holders 16 positioned behind the fuel nozzles 14 create the turbulent-wake conditions that are necessary to permit the ignition of the air-fuel mixture and its combustion in region 17 thereby providing propulsive thrust for the vehicle in a manner similar to that of a conventional ram-jet. The tail section 20 of the vehicle is provided with a gas generator such as a starting rocket 25 for accelerating the vehicle from rest up to the speed required for ram-jet action to occur. In the forward portion of the vehicle 10, and ahead of the hot combustion region 17, is a compartment 24 (indicated schematically by dotted lines) for housing the crew and the useful load of the vehicle, such as passengers and/or freight.

According to my invention, the transport vehicle 10 is disposed within a tube or tunnel 50 of slightly larger cross-section connecting two or more station points and is propelled along the length of the tube by the fore-to-aft transfer, through the surrounding space separating it from the tube wall (as shown in the embodiment of FIG. 1) and/or through the vehicle itself by means of a central opening (as shown in other illustrative embodiments of the invention), of the air or other fluid filling the remainder of the tube 50. The energy required to effect the propulsion of the carrier vehicle by the displacement and transfer of air immediately in front of the vehicle 10 to the area behind the vehicle may be supplied to the system by conventional means in thermal (e.g., through ram-jet action as shown in FIG. 1) or by mechanical (e.g., by means of a fan or magnetohydrodynamic body force) form, or by a combination of the two.

A transportation vehicle traveling at the high speeds contemplated herein will necessarily be subjected to large transverse acceleration forces, and accordingly, provision must be made for support and restraint against lateral movement on all sides. At sufficiently high supersonic speeds advantage may be taken of the aerodynamic forces produced by the pressure field in the annular space between the vehicle 10 and the tube wall 50 to provide the required support for the vehicle. These forces generate a stabilizing effect of sufficient strength to maintain an axially-symmetric vehicle on a substantially centered path as the vehicle is propelled along the axis of the tube. In the lower range of speeds, the transportation vehicle 10 may be suitably kept on a centered path by a plurality of retractable skid members 19 spaced about the body of the vehicle as shown. Alternatively, lateral support and restrain of the vehicle might be feasibly provided by wheel member riding along a plurality of axially extending tracks spaced about the circumference of the tube (see FIG. 3); by a number of low-clearance devices, such as the so-called "levapads" or air jets, suitably arranged about the surface of the vehicle body itself; or by ground-effect devices providing a floating "air curtain" suspension of the vehicle (see FIG. 5). A floating suspension of this last type is especially advantageous in that a vehicle, so provided can utilize the ground-effect mechanism over the entire speed range of the vehicle, and if the vehicle has an appropriately low center of gravity, it will automatically tilt itself to the correct angle of bank in every turn, independently of the speed at which the turn is negotiated. Other suspension systems, involving, for example forces of a magnetic character, may also be adapted for use with the transportation system proposed herein.

A principal feature of the transportation system of the present invention is that, the transfer of air in the tube from the front to the rear of the vehicle is not just a consequence of the motion of the vehicle but rather the very mechanism by which this motion is produced and maintained. With one or both ends of the tube closed, the air in the tube remains substantially at rest everywhere except in the neighborhood of the vehicle as the carrier advances along the tube to occupy the space immediately in front of it, out of which the air is removed, while making room in the rear for the transferred air mass. Such a propulsion system is to be distinguished from that of conventionally-driven vehicles described previously which, in moving through a tube, cause large displacements of all the air within the tube.

The fluid flow velocities generated during the acceleration and deceleration of the propulsion vehicle in a transportation system according to the present invention are very low (although not zero because of the compressibility of the air filling the tube). Quantitative analyses have shown, for example, that the maximum flow velocities associated with normal accelerations (up to $0.3g$) of a 50-ton vehicle from rest to a steady-state speed of 500 f.p.s. in a 15-ft. diameter tube can be between one and two orders of magnitude lower for the propulsion scheme proposed herein than they would be under similar conditions with conventional propulsion means. An indication of the substantial power saving effected with the proposed method of transportation is afforded by noting that, where the velocity of fluid motion has been reduced by one order of magnitude, the power required to maintain such motion is reduced by three orders of magnitude.

Furthermore, in the present system, the maximum flow velocities occur only as brief, localized transients during the acceleration and deceleration phases of the vehicle; when steady-state speed is reached, the fluid flow velocity becomes effectively negligible throughout the length of the tube. In other words, any motion of the fluid is essentially limited (as opposed to conventional drive systems wherein no such limitations apply) to certain portions of the tube and to certain phases of the vehicle's trip.

During the acceleration and deceleration phases of operation it may be preferable to provide one or more gates as barriers across the tube section to inhibit any general motion of the fluid column throughout the tube. Such barrier gates would prevent any possible interactions with other vehicles traveling within the same tube and would also minimize the effects of the transient flow velocity occurring during these phases. These gates could then be opened after the vehicle had attained a substantially steady-state velocity. Such an arrangement of barrier gates is shown in the schematic diagram of FIG. 2. This diagram is a representation of an exemplary tube transportation system according to the present invention linking at its terminals a pair of remote cities, New York and Washington, with a way-station, Philadelphia, inbetween. The tubular conduit system 50 comprises an elongated oval with stub terminations 51, 52, 53 and 54 for permitting transport vehicles 10 to be removed from or added to the system as desired. As shown, several vehicles 10a . . . 10d of the type embraced by the present invention for carrying passengers and/or freight are provided for travel between the various cities within the tube transportation system. A plurality of barrier gates 60, operated by respective automatic gate controllers 65, are located throughout the tube system to isolate the individual vehicles from each other during their respective acceleration and deceleration phases, in order to prevent interaction of the fluid air masses throughout the tube or any substantial build-up in the transient disturbances created when a particular vehicle undergoes a change in its velocity.

The accelerating vehicle acts as a source of transient pressure disturbances which are propagated away both fore and aft from the vehicle. When such a disturbance reaches an opening in the tube, it is reflected back as a pressure disturbance of the opposite kind—a compression wave is reflected back from an opening as an expansion wave, and vice versa. Such pressure disturbances of opposite kinds traveling in opposite directions, have a cumulative effect on the velocities of the fluid flow in the tube. The returning wave is again reflected back after it reaches the vehicle, and so forth. If such repeated reflections are permitted to continue unchecked, the velocity of air within the tube rapidly builds up to a very high level, and the associated energy losses become very high with a concomitant increase in the energy required to accelerate the vehicle to high speed.

It is therefore desirable that the consequences on fluid flow velocities, associated with the repeated reflection of the transient disturbances created during starting, be eliminated by actually or effectively closing off openings in the tube during the acceleration phase of the vehicle. This objective may be accomplished by either temporarily placing a barrier gate 60 over the opening (as is shown in FIG. 2), or, as an alternative to actually closing off the opening, the acceleration phase of the vehicle may be completed in a satisfactory manner by locating the vehicle at sufficient distance from any opening in the tube such that reflections of the transient disturbances are not able to build up cumulatively to any significant degree before the acceleration phase is completed. This latter expedient serves to effectively seal off any opening in the tube insofar as the build-up of wave reflections are concerned because of the extended time required for wave reflections to travel back and forth between the opening and the accelerating vehicle, and further because of the resultant attenuation in amplitude of the wave resulting from travel down the length of the tube.

Significant advantages of the present invention become readily apparent when the operation of the transport vehicle is compared with more conventional conveyances operating within a tube or out in the open, in air or in water. Since the slipstream of the transport vehicle means remains substantially at rest, its "propulsive efficiency" [the ratio of useful mechanical work done in propelling the vehicle to total mechanical work done] may be regarded as being quite close to unity and therefore higher than that of any other known propulsion means using a fluid as the momentum medium. Furthermore—and this is a particularly distinctive feature of the present system—the wake associated with the drag of the vehicle is also at rest in a stationary frame of reference. Thus the kinetic energy losses associated with fluid motions in both the slipstream and the wake are almost entirely eliminated. The power required for propulsion of the vehicle at any given speed will, accordingly, be less than that for existing vehicles of the same size and shape and, in fact, at steady speed can be reduced in amount to only that necessary to overcome the flow losses inside the vehicle and in the surrounding annular space between the vehicle and the tube wall.

In determining the amount of power required for propulsion at steady supersonic speed, the vehicle itself may be considered, as shown in FIG. 1, as the equivalent of the central body of a conventional jet engine, with the wall of the conduit tube 50 representing the outer shroud of the jet. The propulsion system thus may be viewed as operating, in the steady-speed condition, in a manner similar to that of a jet engine without external drag. For example, consider the case of a supersonic ram-jet of conventional configuration having a similar spike-type intake diffuser 12 and operating at zero angle of attack at its design Mach number, with the leading edge of the conical shock wave 15 just touching the cowl of the engine. Ahead of this shock wave the air upstream is everywhere undisturbed, and no change in conditions would result from the substitution of a solid tubular boundary for the imaginary container enclosing the cylindrical volume of air that will be captured as the ramjet advances through the fluid medium. If now the whole wall enclosing the captured streamtube both upstream and downstream of the leading shock wave be made stationary relative to the undisturbed air ahead, without however changing the velocity of the centerbody (a situation which represents that shown in FIG. 1 of the self-propelling vehicle 10 in the tube 50), the internal air flows in the two cases will differ only in their velocities relative to the stationary wall behind the leading shock wave and in the associated viscous effects. Except for these differences, which are of minor concern for the purpose of determining the propulsion power requirements, the fluid air flow undergoes the same transformation in both cases. Therefore, it may be shown that the power required to propel the transport vehicle 10 can be calculated to a good approximation, by analogy with that of a jet engine in the condition of zero thrust, according to the following formula:

$$P = \frac{p_0 A V l}{550} \quad \text{(Equation 1)}$$

where P is the power required in horsepower; $p_0$, the static pressure of the undisturbed air in the tube in pounds per square foot; A, the cross-sectional area of the tube in square feet; V, the velocity of the vehicle in feet per second; and $l$, the percentage loss of relative total pressure that is associated with all of the iso-energetic processes in the air-stream transfer passages.

It is to be observed here that any estimate of the propulsion power requirement based on conventional jet-engine air intake design would be conservatively high, if the fluid transfer occurs entirely through the annular passage surrounding the vehicle within the tube, due to the favorable scale effects and the absence of any flow distortions resulting from changes in angle of attack or yaw of the vehicle. These factors make it possible to attain lower values for $l$ in the present system than have been attained in conventional air intakes. (Representative experimental values of $l$ for conventional jet-engine air intakes vary from 0.02 at moderate subsonic speed, to 0.04 at high subsonic speeds, to 0.05 at Mach number 1.5, and to 0.07 at Mach number 1.85.) Furthermore, in the present case the outer boundary of the airstream passage (the internal surface of the tube wall) is not stationary in the frame of reference of the vehicle as is so for a conventional jet intake; instead, this boundary moves at the velocity V in this frame of reference in the direction of the relative air flow. As the tube wall moves relative to the vehicle, and is stationary relative to the undisturbed air upstream, energy losses due to viscous forces are substantially reduced, and the propulsion power requirement is lowered accordingly.

There are important safety features attendant to the operation of a high-speed vehicle within a tube in accordance with the transpotration scheme of the present invention—in particular, the protection from gusts (which would otherwise be of serious consequence at high speeds), and the braking and cushioning action provided by the air columns adjacent to the transportation vehicle in the event of emergency stops or power failure. In this last regard, an important feature of my transportation system is the unique manner in which the vehicle 10 traveling in the conduit tube 50 can be brought quickly to rest from high speeds. At the high speeds contemplated herein it would not be practicable to dissipate all of the kinetic energy stored in the moving vehicle through conventional braking means, i.e., that provided by sliding friction between solid surfaces.

In contradistinction to other types of vehicles, wherein thrust and drag are generated and controlled separately, in the present conveyance these two forces are closely interdependent. As soon as the propulsive power input is shut off, the retarding force due to the drag assumes the character and magnitude associated with conventionally driven vehicles. Accordingly, large disturbances are set up in the adjacent fluid masses, and a flow in the airstream transfer passages is then maintained only by virtue of the pressure differential built up through and around the vehicle by these very same disturbances. In fact, the action of the vehicle on the fluid in the tube in this situation becomes similar to that of a piston of some permeability, and the result of such action is a drag or retarding force exerted on the vehicle very much greater than that produced in the power-on condition.

The effective permeability of the vehicle, and hence the airstream braking action, may be readily controllable over wide limits by any of a variety of suitable means. The permeability of the vehicle to the airstream can be increased, for example, by the opening of appropriate vents, or alternatively it can be decreased, for example, through the insertion of spoilers in the airstream transfer passages or through windmill operation of the fan or compressor used for inducing the transfer of the fluid mass past the vehicle.

Following the shut-off of propulsive power, the airstream braking forces described above build up at first, as the pressure waves propagate away from the vehicle and increasingly larger masses of air are induced to flow within the tube with their attendant frictional losses, and then decrease, as the vehicle slows down. The velocity of the vehicle will eventually become low enough such that it can then be easily brought to a full stop by conventional sliding-friction means. In this manner the kinetic energy initially stored in the moving vehicle is distributed by this airstream braking process over such a relatively enormous fluid mass within the tube that its dissipation, as the vehicle is slowed down, does not produce any difficulties with localized heating or wear of the braking mechanism.

FIG. 3 shows a second illustrative embodiment of the present invention wherein the displacement and transfer of the fluid airstream is effected completely external to the vehicle by a propeller means. The streamlined body of the vehicle 100 has a compartment 124 for housing the crew and the useful load of the vehicle. The vehicle is guided along within the tubular conduit 50 by a spaced plurality of wheels 119 disposed about the body of the vehicle and contacting respective tracks 121 extending axially along the length of the tube. The propulsion means for driving the vehicle within the conduit 50 is located at the tail portion of the vehicle 100 and comprises a prime mover 125 (an electric motor or a gasoline engine) for rotating air propeller blades 130 which are supported within a shroud 132. In this embodiment, as is true in the embodiment of the invention shown in FIG. 1, the fore-to-aft displacement and transfer of the fluid airstream is accomplished wholly outside the vehicle in the annular space between the exterior of the vehicle 10 and the walls of the conduit 50.

FIG. 4 shows a third embodiment of a self-propelled vehicle suitable for use in a tube transportation system according to the present invention, wherein transfer of the fluid airstream is effected both internally and externally of the vehicle. In this embodiment the vehicle 200 similarly contains a compartment 224 and is guided along within the conduit 50 by a plurality of wheel members 219 riding along axially-extending tracks 221. A portion of the fluid mass directly in front of the vehicle is captured by scoops 220 in the nose of the vehicle and transferred within a duct 225, internally of the vehicle, to propulsion means 230 carried in the tail 215 of the vehicle. The remainder of the fluid air mass in front of the traveling vehicle passes to the rear in the open space between the exterior of the vehicle and the walls of the tube. A plurality of fresh air intakes 223, arranged on the surface of the vehicle near its mid-portion, capture boundary layer air which is similarly transferred to the rear propulsion means 230 via the transfer duct 225. In the embodiment shown in FIG. 4a air is impelled internally through the moving vehicle by a fan 230 whose blades 232 are rotated adjacent to stator vanes 234 by a prime mover 233.

A variation of this embodiment is shown in FIG. 4b wherein the propulsion means 230a in the tail 215 of the vehicle comprises a turbofan. The air mass captured by the scoops 220 and by the fresh air intakes 223 is channeled internally of the vehicle via transfer duct 225 to the low pressure fan 241, a portion of the air mass being subsequently diverted into the high pressure fan 242 and then into the combustion chamber 244. Fuel supplied from nozzle 240 is intermixed with the compressed air prior to combustion of the mixture in the chamber 244, the expanding, combusted gases serving to energize turbines 245 and 246 which drive compressors 242 and 241 respectively.

FIG. 5 shows a fourth illustrative embodiment of the present invention, wherein a compressor is utilized to energize airstream flow internally of the vehicle for both propulsion and ground-effect support of the vehicle. In this embodiment, the vehicle 300 carries its controls, crew, and useful load in compartment 324 while traveling along inside tube conduit 50. In the nose of the vehicle 300 is an air intake 330 which captures a portion of the fluid mass directly in front of the vehicle. This captured air is compressed by blades 332 operating between stator vanes 334 and fed to a collector or spiral volute 335, which then directs a portion of the now-compressed air through a plurality of slots 320 disposed along the exterior of the vehicle 300.

The highly-pressurized air escaping out of the slots 320 forms "air curtains" 319 to provide ground-effect restraint and suspension of the vehicle as it travels at high speed within the conduit 50. The front portion of the air curtain in each pad can be turned off when the forward speed of the vehicle 300 is high enough to provide a ram pressure equal to—or higher than—the required ground-effect pressure. Under these conditions, the rearward momentum of the deflected curtains contributes to the thrust, and the separate expenditure of power to support the vehicle is thereby largely or even totally eliminated.

The remainder of the compressed air (the portion not used for ground-effect support) is carried along inside the length of the vehicle 300 within a transfer passage 325, and it is then intermixed with fuel supplied from nozzle 340 just prior to combustion of the fuel-air mixture in the vicinity of the flame holder 341. The combusted gases drive the turbine 345 located in the rear of the vehicle 300 before escaping out of the tail exhaust 349. The power output of the turbine 345 is then utilized to drive the forward-located compressor either directly as shown by a shaft linkage 347, or alternatively by a generator-motor arrangement.

FIG. 6 shows a fifth illustrative embodiment of a self-propelled vehicle suitable for use in a tube transportation system according to the present invention, wherein air from a compressor is utilized as the propulsion means, in a manner similar to an ejector pump, to effect transfer of the fluid airstream externally of the vehicle. The vehicle 400 with its compartment 424 travels within the tube conduit 50 at high speed by the continuous displacement and transfer of the fluid air mass directly in front of the vehicle to the immediate rear of the vehicle while leaving the remainder of the air mass in the conduit substantially undisturbed. A compressor 412, driven by prime mover 415, transfers the air mass externally of the vehicle through the annular space separating it from the walls of the tube 50. Air captured at the intake 411 in the nose of the vehicle 400 is energized by the rotating impeller vanes of the compressor 412 and sent through diffuser vanes 413, after which the compressed air is discharged into the annular space surrounding the vehicle, in the form of a "driving stream," out of vents located on the sides of the vehicle 400. This discharged, highly-pressurized air constitutes the driving flow which effects the transfer of the fluid mass in the tube from the front to the rear of the traveling vehicle. Controls, crew and useful load are carried in compartment 424. Support and restraint of the vehicle may be provided by ground-effect pads or the suspension devices of any of the types previously described. For the sake of clarity, suspension devices have been omitted from this figure.

Figure 7:
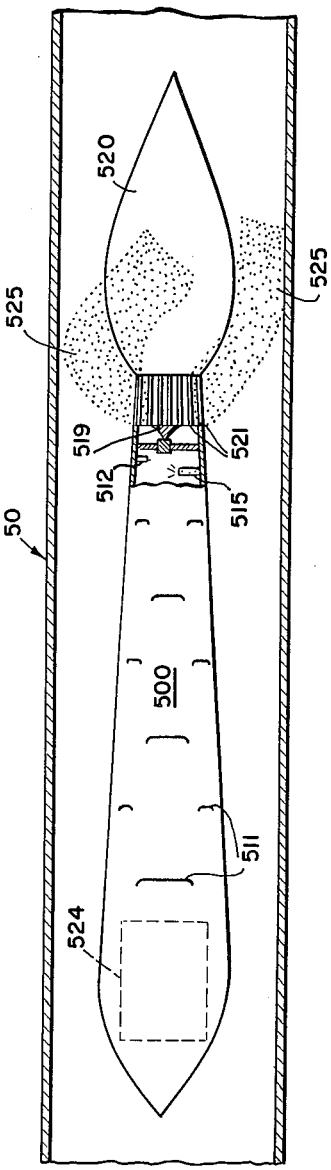
FIG. 7 is a side elevational view of a sixth embodiment of the present invention.

FIG. 7 is a sixth illustrative embodiment of the present invention wherein the propulsion means is a crypto-steady pressure exchanger utilized to energize and to effect the transfer of the fluid airstream externally of the vehicle. As shown in the figure, the vehicle 500, with a crew, controls, and freight in compartment 524 in its fuselage, moves to the left within the tubular conduit 50. Propulsion of the vehicle 500 is provided by a crypto-steady pressure exchanger located in the rear of the vehicle. The principles of operation of such a propulsion means are fully described in my co-pending U.S. patent application Serial No. 592,642, filed June 20, 1956, and issued on July 31, 1962, as U.S. Patent No. 3,046,732. Adapting the terminology employed in the aforementioned patent, in the embodiment of the present invention shown in FIG. 7, scoops 511 are provided on the body of the vehicle for the capture of the "primary" air to be energized and later discharged to form pseudo-blades. The captured primary air is intermixed within the vehicle with fuel supplied by nozzle 515 and the mixture then combusted behind flame holder 512. The combusted gases energize a rotor 519 which is of the type shown in FIG. 6 of my aforementioned patent. The primary air is then discharged from the vehicle in the form of pseudo-blades 525 of a crypto-steady pressure exchanger which act upon the surface of the tail 520 to provide propulsion of the vehicle. As is more fully brought out in Patent No. 3,046,732 and on pages 234–237 of Elements of Flight Propulsion—Joseph V. Foa—John Wiley & Sons, Inc., 1960, the primary or driving flow discharged from the vehicle forms a pattern designated as a pseudo-blade which functions in some respects in a manner similar to that of a blade formed of solid, abiding material. The discharge of the primary flow to form the pseudo-blades develops thrust as a result of the conventional jet effect and there is an additional increment of thrust developed characteristic of the process described in said patent resulting from an essentially non-dissipative transfer of energy to the secondary or driven flow from the primary flow forming the pseudo-blades across the interface between the pseudo-blades and the driven flow [conventional means for providing the necessary support and restraint of the vehicle at rest and at slow-speed operation have been omitted from the figure for purposes of clarity.]

While, in the various illustrative embodiment of the invention, a particular type of lateral support and restraining means has been shown with a specific vehicle embodiment, it will be appreciated that other kinds of vehicle support and restraining means can be readily adapted for use with each such embodiment.

The terms and expressions which have been employed here are used as terms of description and not of limitation, and there is no intention, in the use of such terms and expressions, of excluding equivalents of the features shown and described, or portions thereof, it being recognized that various modifications are possible within the scope of the invention claimed.

What is claimed is:

1. A high-speed transportation system comprising, a fluid-filled conduit linking a plurality of station points, the fluid in said conduit being substantially at atmospheric pressure, a vehicle movable within and guided by said conduit, means for propelling said vehicle at high velocity along portions of said conduit including means for continuously effecting the displacement and transfer of the fluid from substantially directly in front of said vehicle to substantially directly behind the same while maintaining the remainder of the fluid in the portion of said conduit occupied by said vehicle substantially at rest, said vehicle having a maximum cross-section less than that of said conduit with the vehicle and the conduit forming a space therebetween through which passes a substantial portion of the fluid transferred from in front of to behind said vehicle.

2. A high-speed transportation system comprising, a fluid-filled conduit linking a plurality of station points, the fluid in said conduit being substantially at atmospheric pressure, a vehicle movable within and guided along by said conduit, and means for accelerating and propelling said vehicle at substantially constant velocity by continuously effecting the displacement and transfer of the fluid directly in front of said vehicle to directly in the rear thereof, while maintaining the remainder of the fluid in said conduit substantially at rest, said vehicle having a maximum cross-section less than that of said conduit with the vehicle and the conduit forming a space therebetween through which passes a substantial portion of the fluid transferred from in front of to behind said vehicle.

3. A high-speed transportation system comprising, a fluid-filled conduit of substantially uniform cross-section linking a plurality of station points, the fluid in said conduit being substantially at atmospheric pressure, and a self-propelled vehicle movable within and guided along by said conduit, said vehicle being of lesser cross-section than said conduit thereby forming a space therebetween, said vehicle including means for propelling it along said conduit at substantially constant velocity by continuously effecting the fore-to-aft displacement and transfer of the fluid from in front of said vehicle to the rear thereof through the space separating said vehicle from said conduit at a rate such that the remainder of the fluid in said conduit remains substantially at rest.

4. A high-speed transportation system comprising, a fluid-filled conduit linking a plurality of station points, the fluid in said conduit being substantially at atmospheric pressure, said conduit having at least one opening capable of reflecting pressure wave disturbances in said fluid, a vehicle movable within and guided along by said conduit, means for propelling said vehicle along said conduit at high velocity by continuously effecting the fore-to-aft transfer of the fluid directly in front of said vehicle to the rear thereof, and barrier means in said conduit for temporarily closing off said opening during acceleration of said vehicle near said opening, said vehicle having a maximum cross-section less than that of said conduit with the vehicle and the conduit forming a space therebetween through which passes a substantial portion of the fluid transferred from in front of to behind said vehicle.

5. A high-speed transportation system comprising, a fluid-filled conduit linking a plurality of station points, the fluid in said conduit being substantially at atmospheric pressure, said conduit having at least one opening capable of reflecting pressure wave disturbances in said fluid, a self-propelled vehicle movable within and guided along by said conduit, said vehicle including means for accelerating and propelling it along said conduit at substantially constant velocity by continuously effecting the fore-to-aft transfer of the fluid from in front of said vehicle to the rear thereof, said fore-to-aft fluid transfer when said vehicle is moving at substantially constant velocity being effected at a rate such that the remainder of the fluid in said conduit remains substantially at rest, and barrier means in said conduit for temporarily closing off said opening during acceleration of said vehicle near said opening, said vehicle having a maximum cross-section less than that of said conduit with the vehicle and the conduit forming a space therebetween through which passes a substantial portion of the fluid transferred from in front of to behind said vehicle.

6. A high-speed transportation system comprising, a fluid-filled conduit of substantially uniform circular cross-section linking a plurality of station points, the fluid in said conduit being substantially at atmospheric pressure, and a self-propelled axially-symmetric vehicle movable within and guided along by said conduit, said vehicle including means for propelling said vehicle at high velocity by continuously effecting the displacement and transfer of the fluid directly in front of said vehicle to the rear thereof at a rate such that the remainder of the fluid in said conduit remains substantially at rest, wherein suspension and self-centering of said vehicle within said conduit at high speed is provided by aerodynamic fluid pressures exerted on said vehicle, said vehicle having a maximum cross-section less than that of said conduit with the vehicle and the conduit forming a space therebetween through which passes a substantial portion of the fluid transferred from in front of to behind said vehicle.

7. The method of propelling a vehicle through a conduit containing a fluid substantially at atmospheric pressure which comprises transferring the fluid directly in front of the vehicle to directly behind the vehicle at a rate substantially equal to VA where V equals the speed of said vehicle relative to said conduit and A equals the cross-sectional area of the conduit, a substantial portion of the thus transferred fluid being transferred through a space extending about the vehicle between the vehicle and the interior wall of said conduit.

8. A transportation system comprising a fluid-filled conduit linking a plurality of station points, a self-propelled vehicle movable within and guided along by said conduit, the fluid in said conduit being substantially at atmospheric pressure except where disturbed by said moving vehicle, said vehicle including means for propelling it along said conduit by continuously effecting the fore-to-aft transfer of fluid directly in front of said vehicle to the rear thereof, barrier means in said conduit for maintaining substantially all of the remainder of the fluid in said conduit substantially at rest during acceleration of said vehicle, said fore-to-aft fluid transfer when said vehicle is moving at substantially constant velocity being effected at a rate relative to said vehicle substantially equal to VA, where V is the speed of said vehicle relative to said conduit and A the cross-sectional area of said conduit.

9. A transportation system as set forth in claim 8 wherein said vehicle comprises air curtain-forming means for supporting and centering said vehicle in said tube.

References Cited by the Examiner
UNITED STATES PATENTS

| | | | |
|---|---|---|---|
| 1,336,732 | 4/20 | Davy | 104—138 |
| 1,727,720 | 9/29 | Kruckenberg. | |
| 2,511,979 | 6/50 | Goddard | 104—138 |
| 2,717,744 | 9/55 | Birnbaum | 104—155 X |
| 2,864,318 | 12/58 | Toulmin | 104—134 X |
| 2,869,479 | 1/59 | Hutchinson | 104—155 |
| 3,006,288 | 10/61 | Brown | 104—138 |
| 3,046,732 | 7/62 | Foa | 60—35.6 |
| 3,055,312 | 9/62 | Jay et al. | 104—134 |
| 3,087,439 | 4/63 | Petrocokino | 104—138 |
| 3,090,328 | 5/63 | Berggren | 104—138 |
| 3,100,454 | 8/63 | Dennis | 104—138 |
| 3,108,546 | 10/63 | Hafner | 104—138 |

MILTON BUCHLER, *Primary Examiner.*

JAMES S. SHANK, LEO QUACKENBUSH, *Examiners.*